United States Patent
Nakagawa et al.

(10) Patent No.: US 9,091,522 B2
(45) Date of Patent: Jul. 28, 2015

(54) SHAPE MEASURING MACHINE AND METHOD OF CORRECTING SHAPE MEASUREMENT ERROR

(71) Applicant: MITUTOYO CORPORATION, Kanagawa (JP)

(72) Inventors: Hideyuki Nakagawa, Ibaraki (JP); Nobuhiro Ishikawa, Ibaraki (JP)

(73) Assignee: MITUTOYO CORPORATION, Kanagawa (JP)

( * ) Notice: Subject to any disclaimer, the term of this patent is extended or adjusted under 35 U.S.C. 154(b) by 177 days.

(21) Appl. No.: 13/971,235

(22) Filed: Aug. 20, 2013

(65) Prior Publication Data

US 2014/0059872 A1    Mar. 6, 2014

(30) Foreign Application Priority Data

Sep. 4, 2012  (JP) .................................. 2012-193906
Dec. 10, 2012  (JP) .................................. 2012-268985

(51) Int. Cl.
    *G01B 5/008*    (2006.01)
    *G01B 21/04*    (2006.01)

(52) U.S. Cl.
    CPC .............. *G01B 5/008* (2013.01); *G01B 21/045* (2013.01)

(58) Field of Classification Search
    CPC ....... G01B 5/008; G01B 21/045; G01B 21/20
    USPC ....................... 33/502, 503; 702/94, 167, 168
    See application file for complete search history.

(56) References Cited

U.S. PATENT DOCUMENTS

| 2006/0119307 | A1 * | 6/2006 | Kiyotani et al. | 318/632 |
| 2007/0271803 | A1 | 11/2007 | Ishikawa | 33/503 |
| 2008/0065341 | A1 * | 3/2008 | Ishikawa et al. | 702/95 |
| 2010/0161273 | A1 * | 6/2010 | Mansfield | 702/167 |
| 2013/0006579 | A1 * | 1/2013 | Sakurada et al. | 702/168 |
| 2014/0005978 | A1 * | 1/2014 | Shimizu et al. | 702/167 |
| 2014/0303924 | A1 * | 10/2014 | Kumar et al. | 702/94 |

FOREIGN PATENT DOCUMENTS

JP    2007-315897    12/2007

* cited by examiner

*Primary Examiner* — G. Bradley Bennett
(74) *Attorney, Agent, or Firm* — Greenblum & Bernstein, P.L.C.

(57) ABSTRACT

A shape measuring machine includes a slider that supports a scanning probe. A scale unit detects a displacement of the slider. A tip sphere displacement detection unit detects a displacement of the tip sphere. A calculation unit includes a correction filter including a first and second filters and an adder, and calculates a measurement value from the displacements of the slider and the tip sphere. The first filter corrects the displacement of the slider based on a frequency transfer characteristic from the scale unit to the tip of the slider. The second filter outputs a value that is obtained by correcting a value corrected by the first filter based on a frequency transfer characteristic from the tip of the slider to the tip sphere as the correction value. The adder outputs a measurement value obtained by adding the correction value and the displacement of the tip sphere.

10 Claims, 13 Drawing Sheets

SHAPE MEASURING MACHINE AND METHOD OF CORRECTING SHAPE MEASUREMENT ERROR

INCORPORATION BY REFERENCE

This application is based upon and claims the benefit of priority from Japanese patent applications No. 2012-193906, filed on Sep. 4, 2012, and No. 2012-268985, filed on Dec. 10, 2012, the disclosure of which is incorporated herein in its entirety by reference.

BACKGROUND OF THE INVENTION

1. Field of the Invention

The present invention relates to a shape measuring machine and a method of correcting a shape measurement error. For example, the present invention relates to a shape measuring machine such as a coordinate measuring machine and a method of correcting an error in its shape measurement.

2. Description of Related Art

These days, shape measuring means such as a coordinate measuring machine (hereinafter, also referred to as CMM) is used to inspect the machining accuracy (or processing accuracy) of a product having a 3D (three-dimensional) shape. Such a CMM carries out shape measurement, for example, by moving a scanning probe along a 3D shape.

For example, when measurement using a scanning probe is carried out by using a shape measuring machine such as a CMM, measurement errors occur due to effects caused by the movement of the slider on which the scanning probe is mounted. For example, when a circle is measured by using a scanning probe, motion errors called "quadrant projections" occur. The quadrant projection is a projection-shaped motion error that occurs when the quadrant of the mechanical orthogonal coordinate system of the measuring machine is changed (when the motion direction on each axis is reversed) in the circular motion of the scanning probe. Further, due to this quadrant projection, a projection-shaped measurement error occurs. The quadrant projection is mainly caused by a backlash and the like resulting from the mechanical structure of the measuring machine.

FIG. 13 shows a measurement result that is obtained by measuring the shape of a ring gage (ring-shaped object to be measured) by using a typical coordinate measuring machine. As shown in FIG. 13, a projection measurement error is observed in the boundary area P1 between the fourth quadrant and the first quadrant and in the boundary area P2 between the second quadrant and the third quadrant in the measurement waveform. They are measurement errors resulting from quadrant projections caused by backlashes and the like that occur when the motion of the scanning probe in the X-axis direction is reversed.

Further, Japanese Unexamined Patent Application Publication No. 2007-315897 discloses an example of a method of correcting an error in measurement using a scanning probe. According to this technique, the position of the tip of the slider is estimated by using a correction filter based on the frequency transfer characteristic between the scale and the slider tip. Then, a measurement value is calculated by adding the estimated value and a probe detection value, so that the measurement error that occurs due to the quadrant projection can be corrected.

SUMMARY OF THE INVENTION

However, the inventors have found that there is the following problem in the above-described technique. The above-described technique disclosed in Japanese Unexamined Patent Application Publication No. 2007-315897 can eliminate the measurement error resulting from the frequency transfer characteristic between the scale unit, which detects the displacement amount of the probe through the slider of the CMM, and the tip of the slider. However, depending on the type of the probe used in the scanning measurement, a relative displacement between the position of the tip of the slider and the reference position of the tip sphere of the scanning probe could occur. Note that the reference position of the tip sphere of the scanning probe is the position of the tip sphere when the tip sphere is not in contact with the object to be measured. The relative displacement like this becomes noticeable when the response of the scanning probe is poor and thus the reference position of the tip sphere of the scanning probe cannot follow the movement of the position of the slider tip. When such a relative displacement occurs, the above-described technique cannot eliminate the measurement error resulting from the frequency transfer characteristic from the tip of the slider to the tip of the probe that is in contact with the object to be measured.

A shape measuring machine according to a first aspect of the present invention includes: a scanning probe that performs scanning measurement by using a tip sphere disposed at a tip of a stylus attached to one end of the scanning probe, the tip sphere being configured to come into contact with an object to be measured; a movably-disposed slider that supports the scanning probe at another end of the scanning probe opposite to the tip sphere; a scale unit that detects a displacement of the slider; a tip sphere displacement detection unit that detects a displacement of the tip sphere of the scanning probe with respect to a junction between the scanning probe and the slider; and a calculation unit that calculates a measurement value from the displacement of the slider detected by the scale unit and the displacement of the tip sphere detected by the tip sphere displacement detection unit, in which the calculation unit includes: a correction filter that outputs a correction value, the correction value being obtained by correcting the displacement of the slider detected by the scale unit based on a frequency transfer characteristic from the scale unit to the tip sphere; and an adder that adds the correction value and the displacement of the tip sphere detected by the tip sphere displacement detection unit, and the correction filter includes: a first filter that corrects the displacement of the slider detected by the scale unit based on a frequency transfer characteristic from the scale unit to the junction between the scanning probe and the slider; and a second filter that outputs a value as the correction value, the value being obtained by correcting a value corrected by the first filter based on a frequency transfer characteristic from the junction between the scanning probe and the slider to the tip sphere.

A shape measuring machine according to a second aspect of the present invention is the above-described shape measuring machine, in which the first filter corrects the displacement of the slider detected by the scale unit based on an estimated value of the frequency transfer characteristic from the scale unit to the junction between the scanning probe and the slider, and the second filter corrects the value corrected by the first filter based on an estimated value of the frequency transfer characteristic from the junction between the scanning probe and the slider to the tip sphere.

A shape measuring machine according to a third aspect of the present invention is the above-described shape measuring machine, in which the frequency transfer characteristic is actually measured for each movement direction axis of the slider, and the estimated value of the frequency transfer characteristic is calculated as a transfer function based on an actual measurement value of a frequency transfer characteristic for each movement direction axis of the slider.

A shape measuring machine according to a fourth aspect of the present invention is the above-described shape measuring machine, further including a storage unit storing a design value indicating a shape of an object to be measured, in which the calculation unit further includes: a subtracter that outputs a value obtained by subtracting the design value from the displacement of the slider detected by the scale unit as a motion error of the slider to be input to the first filter; and a second adder that outputs a value obtained by adding the design value to the value output from the second filter as the correction value output from the correction filter.

A shape measuring machine according to a fifth aspect of the present invention is the above-described shape measuring machine, in which the second filter includes: a third filter that outputs a value obtained by correcting a value corrected by the first filter based on a frequency transfer characteristic from the junction between the scanning probe and the slider to an attachment part of the stylus; and a fourth filter that outputs a value as the correction value, the value being obtained by correcting a value corrected by the third filter based on a frequency transfer characteristic from the attachment part of the stylus to the tip sphere.

A method of correcting a shape measurement error according to a sixth aspect of the present invention includes: detecting, by a scale unit, a displacement of a movably-disposed slider, the slider supporting a scanning probe that performs scanning measurement by using a tip sphere disposed at a tip of a stylus attached to one end of the scanning probe, the slider supporting the scanning probe at another end of the scanning probe opposite to the tip sphere, the tip sphere being configured to come into contact with an object to be measured; detecting a displacement of the tip sphere of the scanning probe with respect to a junction between the scanning probe and the slider; correcting the displacement of the slider detected by the scale unit based on a frequency transfer characteristic from the scale unit to the junction between the scanning probe and the slider; outputting a value as the correction value, the value being obtained by correcting the corrected displacement based on a frequency transfer characteristic from the junction between the scanning probe and the slider to the tip sphere; and calculating a measurement value by adding the correction value and the displacement of the tip sphere.

A method of correcting a shape measurement error according to a seventh aspect of the present invention is the above-described method of correcting a shape measurement error, in which the displacement of the slider detected by the scale unit is corrected based on an estimated value of the frequency transfer characteristic from the scale unit to the junction between the scanning probe and the slider, and the corrected displacement of the slider is corrected based on an estimated value of the frequency transfer characteristic from the junction between the scanning probe and the slider to the tip sphere.

A method of correcting a shape measurement error according to an eighth aspect of the present invention is the above-described method of correcting a shape measurement error, in which the frequency transfer characteristic is actually measured for each movement direction axis of the slider, and the estimated value of the frequency transfer characteristic is calculated as a transfer function based on an actual measurement value of a frequency transfer characteristic for each movement direction axis of the slider.

A method of correcting a shape measurement error according to a ninth aspect of the present invention is the above-described method of correcting a shape measurement error, in which a value obtained by subtracting a design value from the displacement of the slider detected by the scale unit is corrected based on the frequency transfer characteristic from the scale unit to the junction between the scanning probe and the slider, and a value obtained by adding a value obtained by correcting the corrected value based on the frequency transfer characteristic from the junction between the scanning probe and the slider to the tip sphere and the design value is output as the correction value.

A method of correcting a shape measurement error according to a tenth aspect of the present invention is the above-described method of correcting a shape measurement error, in which a first value obtained by correcting the corrected displacement based on a frequency transfer characteristic from the junction between the scanning probe and the slider to an attachment part of the stylus is output, and a value obtained by correcting the first value based on a frequency transfer characteristic from the attachment part of the stylus to the tip sphere is output as the correction value.

According to the present invention, it is possible to effectively reduce measurement errors in a shape measuring machine.

The above and other objects, features and advantages of the present invention will become more fully understood from the detailed description given hereinbelow and the accompanying drawings which are given by way of illustration only, and thus are not to be considered as limiting the present invention.

BRIEF DESCRIPTION OF THE DRAWINGS

FIG. 5 is a flowchart showing a frequency transfer characteristic setting method in a first filter 2121a;

DETAILED DESCRIPTION

Exemplary embodiments according to the present invention are explained hereinafter with reference to the drawings. The same symbols are assigned to the same components throughout the drawings, and their duplicated explanation is omitted as appropriate.

First Exemplary Embodiment

Figure 1:
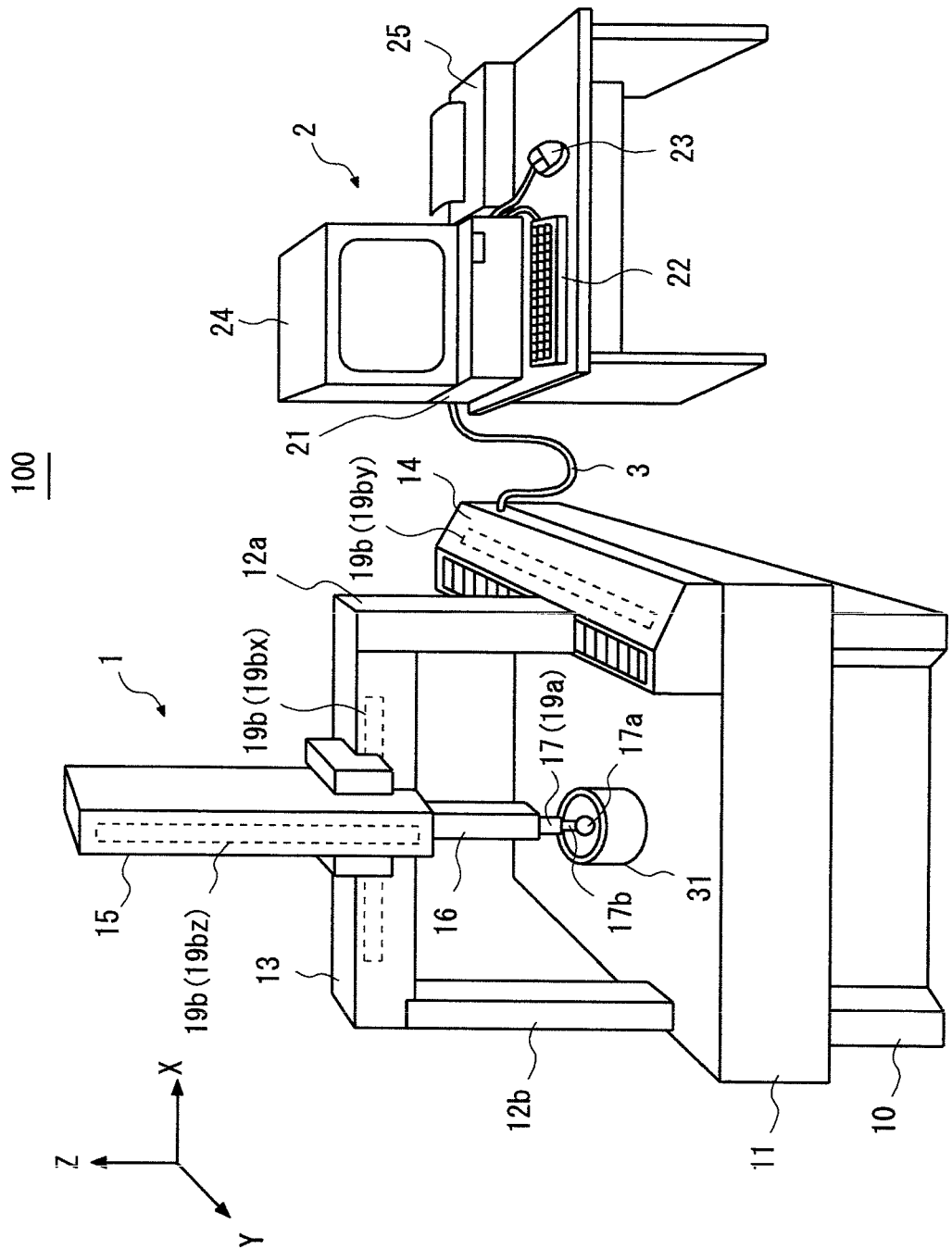
FIG. 1 is a perspective view schematically showing a configuration of a shape measuring machine 100 according to a first exemplary embodiment.

Firstly, a shape measuring machine 100 according to a first exemplary embodiment is explained. FIG. 1 is a perspective view schematically showing a configuration of a shape measuring machine 100 according to a first exemplary embodiment. The shape measuring machine 100 includes a coordinate measuring machine (hereinafter, also referred to as CMM) 1 and a computer 2. The CMM 1 is connected to the computer 2 through a cable 3.

The CMM 1 is configured as shown in FIG. 1, for example, in which a surface plate 11 is mounted on a vibration damping pedestal 10 in such a manner that the upper surface (base surface) of the surface plate 11 coincides with the horizontal plane (XY-plane in FIG. 1). A Y-axis driving mechanism 14 that extends in the Y-direction is disposed at one end of the surface plate 11 in the X-direction. A beam support 12a is disposed in a standing position on the Y-axis driving mechanism 14. In this manner, the Y-axis driving mechanism 14 can drive the beam support 12a in the Y-direction. A beam support 12b is disposed in a standing position on the other end of the surface plate 11 in the X-direction. The bottom end of the beam support 12b is supported by an air-bearing so that the beam support 12b can move in the Y-axis direction. A beam 13 that extends in the X-axis direction is supported at both ends by the beam supports 12a and 12b respectively, and supports a column 15 that extends vertically (in the Z-axis direction). The column 15 is driven in the X-axis direction along the beam 13. A slider 16 is disposed in the column 15 in such a manner that the slider 16 can be driven in the Z-axis direction along the column 15. A scanning probe 17 is attached to the bottom end of the slider 16. Further, a stylus 17b is removably attached to the stylus attachment part of the scanning probe 17. A spherical tip sphere 17a, for example, is disposed at the tip of the stylus 17b.

The tip sphere 17a comes into contact with an object to be measured 31 placed on the surface plate 11 and thereby is pushed away from its reference position (neutral position) by a predetermined pushed amount. A tip sphere displacement detection unit 19a disposed inside the scanning probe 17 outputs an amount of the push (in each of the X, Y and Z axis directions), and the computer 2 takes in the XYZ-coordinate value(s) (amount of shift from the reference position) of the tip sphere 17a in that state.

The computer 2 takes in necessary measurement values by driving and controlling the CMM 1, and performs necessary calculation processing for calculating the surface property of the object to be measured. The computer 2 includes a computer main body 21, a keyboard 22, a mouse 23, a CRT 24, and a printer 25. A typical keyboard, a mouse, a CRT, and a printer can be used as the keyboard 22, the mouse 23, the CRT 24, and the printer 25 respectively, and therefore their detailed explanations are omitted here. Details of the computer main body 21 will be explained later.

Figure 2:
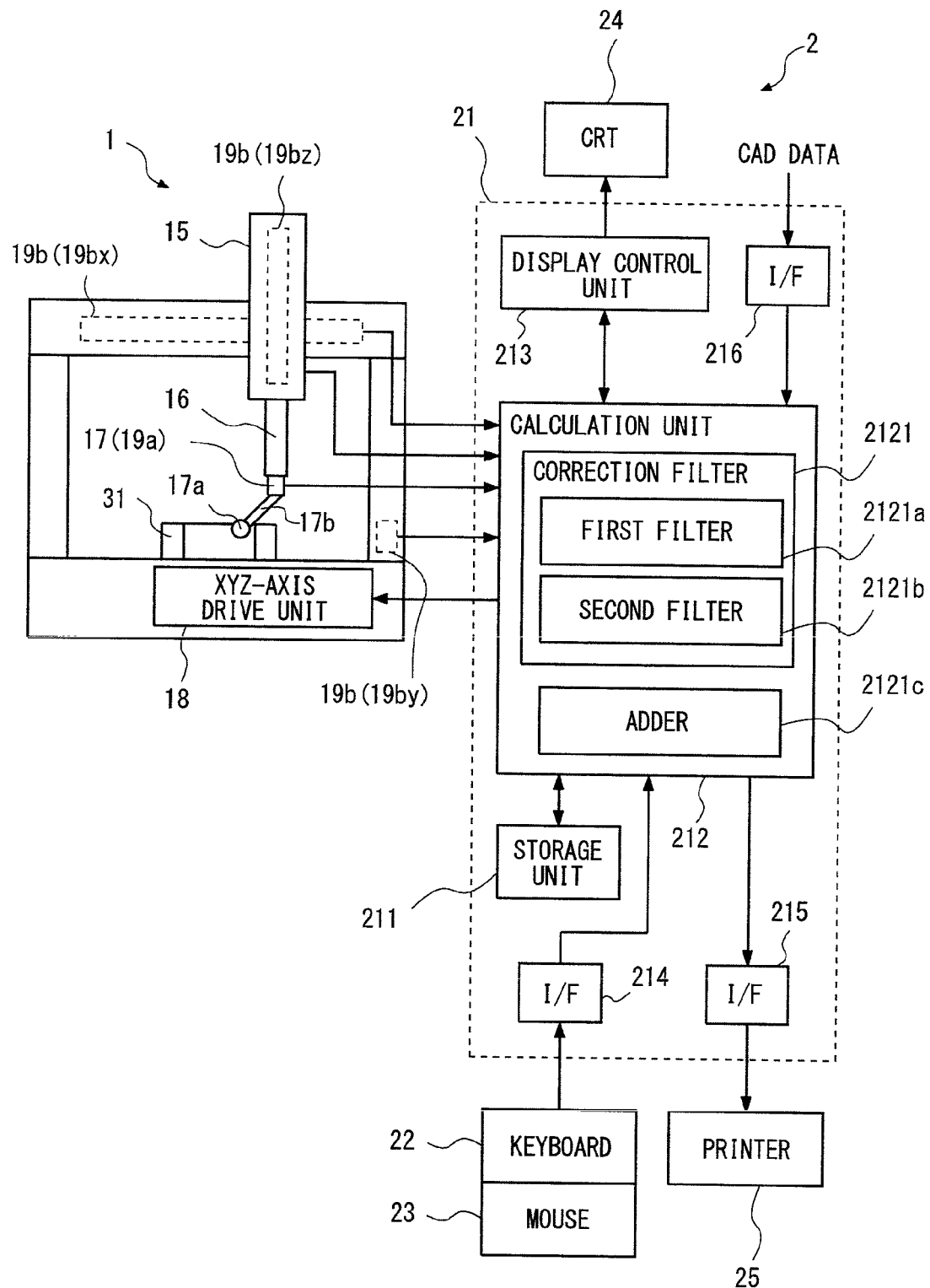
FIG. 2 is a functional block diagram of a shape measuring machine 100 according to a first exemplary embodiment.

Next, a functional configuration of the shape measuring machine 100 is explained with reference to FIG. 2. FIG. 2 is a functional block diagram of the shape measuring machine 100 according to the first exemplary embodiment. The CMM 1 includes an XYZ-axis drive unit 18 and a scale unit 19b. The XYZ-axis drive unit 18 drives the scanning probe 17 in the XYZ-axis directions. As the scale unit 19b moves in the XYZ-axis directions, the scale unit 19b outputs movement pulses for each axis direction of the slider 16.

The scale unit 19b includes an X-axis scale unit 19bx, a Y-axis scale unit 19by, and a Z-axis scale unit 19bz. The X-axis scale unit 19bx is disposed in the beam 13 and detects a displacement of the column 15 in the X-axis direction. The Y-axis scale unit 19by is disposed near the Y-axis driving mechanism 14 and detects a displacement of the beam support 12a in the Y-axis direction. The Z-axis scale unit 19bz is disposed in the column 15 and detects a displacement of the slider 16 in the Z-axis direction. The detected displacement information of the tip sphere 17a (amount of shift on each of the XYZ-axes output from the tip sphere displacement detection unit 19a) and the detected displacement information of the slider 16 (displacement on each of the XYZ-axes output from the scale unit 19b) are output to a calculation unit 212 (which is described later). Note that the scale unit 19b is adjusted in advance so that the scale unit 19b outputs the reference position of the tip sphere 17a in a state where no relative displacement occurs between the scale unit 19b and the reference position of the tip sphere 17a.

The computer main body 21 of the computer 2 includes, as a main component, an HDD, a semiconductor memory, or the like. The computer main body 21 includes a storage unit 211, a calculation unit 212, a display control unit 213, and I/Fs (interfaces) 214 to 216. The storage unit 211 stores entered information. The calculation unit 212 includes a CPU or the like, and drives the CMM 1 and calculates measurement values. The display control unit 213 controls images to be displayed in the CRT 24. Note that the storage unit 211 also stores a surface property measurement program for driving the CMM 1, detection values detected by its measurement, design values of an object(s) to be measured, and so on. The calculation unit 212 reads the surface property measurement program from the storage unit 211 and measures the shape of an object to be measured.

The calculation unit 212 receives instruction information by an operator that is entered from the keyboard 22 and the mouse 23 through the I/F (interface) 214. Further, the calculation unit 212 takes in detected tip sphere displacement information and slider displacement information. The calculation unit 212 moves the slider 16 by using the XYZ-axis drive unit 18, detects measurement values of the object to be measured 31, and performs various processes such as a process for correcting a measurement value based on the above-described input information, the instruction information by the operator, and the program stored in the storage unit 211. The calculation unit 212 outputs measurement values calculated through various processes to the printer 25 through the I/F (interface) 215. Note that the I/F (interface) 216 is used to convert CAD data of the object to be measured 31 provided by an external CAD system or the like (not shown) into a predetermined format and to supply the converted CAD data to the computer main body 21.

Figure 3:
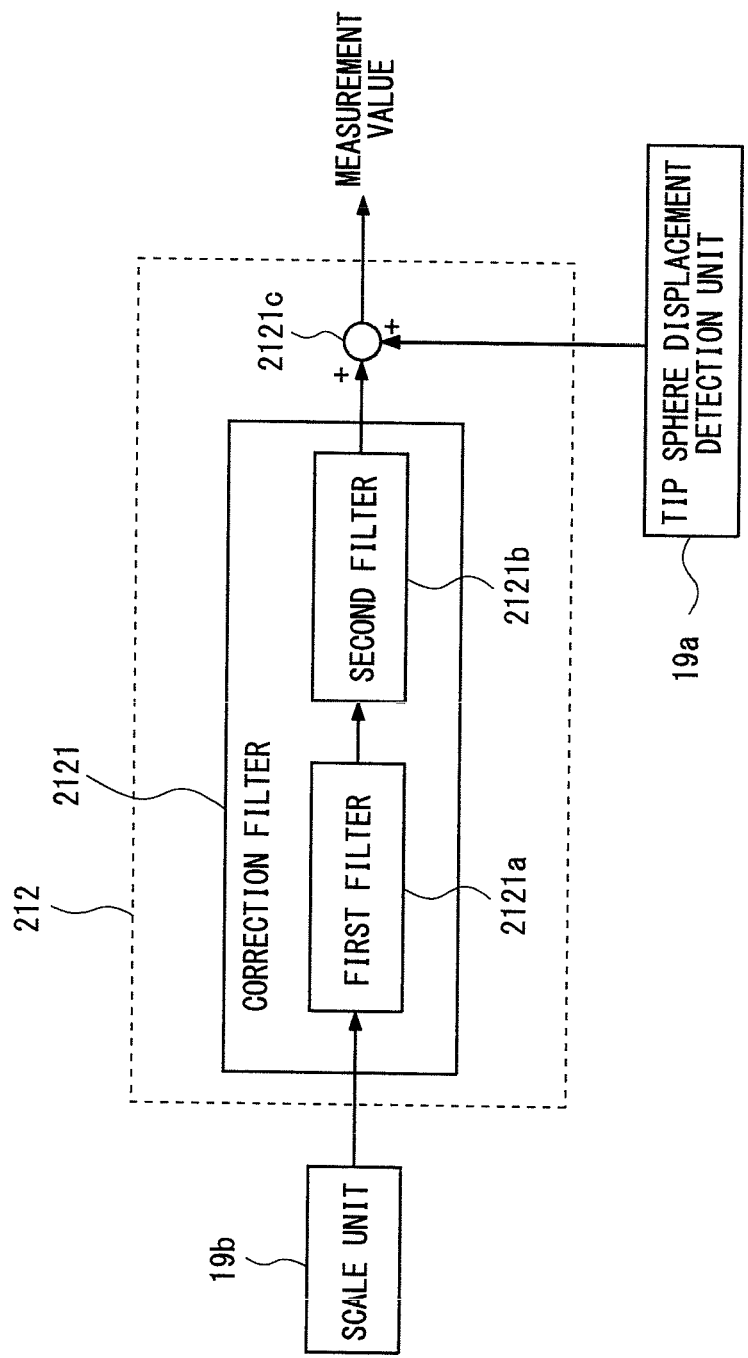
FIG. 3 is a control block diagram of a calculation unit 212 and its peripheral devices.
Figure 4:
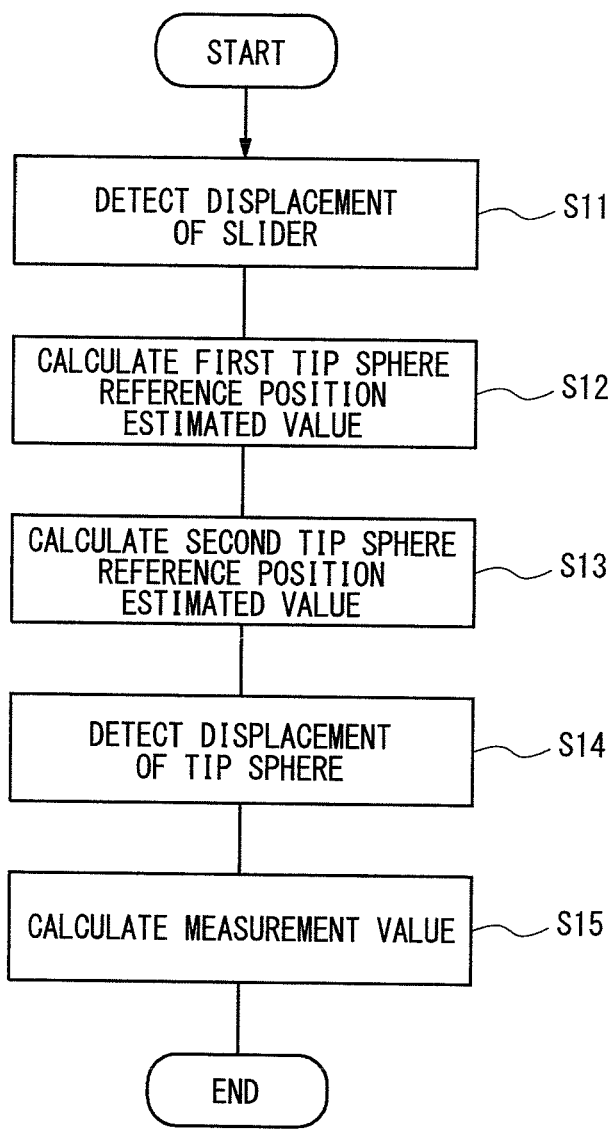
FIG. 4 is a flowchart showing a measurement value calculation process performed by a calculation unit 212.

Next, a functional configuration of the calculation unit 212, which calculates a measurement value of an object to be measured 31, and a process for calculating a measurement value are explained with reference to FIGS. 3 and 4. FIG. 3 is a control block diagram of the calculation unit 212 and its peripheral devices. FIG. 4 is a flowchart showing a measurement value calculation process performed by the calculation unit 212.

Firstly, the scale unit 19b detects a displacement of the slider 16 (step S11) and supplies the detected displacement to the calculation unit 212. The calculation unit 212 includes a correction filter 2121. The correction filter 2121 includes a first filter 2121a and a second filter 2121b.

The first filter 2121a calculates a first tip sphere reference position estimated value, which is the reference position (coordinates) of the tip sphere 17a in a measurement space, based on the supplied displacement of the slider 16 (step S12). For example, the first filter 2121a uses an estimated value Ge1($s$) that is defined so as to approximate a frequency transfer characteristic up to the tip of the slider 16 based on the actually-measured displacement of the scale unit 19b as a correction value. For example, the estimated value Ge1($s$) is Expression (1) shown below.

[Expression 1]

$$Ge1(s) = \frac{\omega_P^2(s^2 + 2\xi_Z\omega_Z s + \omega_Z^2)}{\omega_Z^2(s^2 + 2\xi_P\omega_P s + \omega_P^2)} \quad (1)$$

In the expression, $\omega_Z$ is an angular frequency at the zero point; $\omega_P$ is an angular frequency at the pole; $\xi_Z$ is an attenuation factor at the zero point; and $\xi_P$ is an attenuation factor at the pole. Note that the zero point indicates the value of the variable s when the Ge1($s$) is zero. The pole indicates the value of the variable s when the Ge1($s$) is infinity.

The second filter 2121b calculates a second tip sphere reference position estimated value based on the first tip sphere reference position estimated value calculated by the first filter 2121a (step S13). The second filter 2121b uses an estimated value Ge2($s$) that is defined so as to approximate a frequency transfer characteristic from the tip of the slider 16 to the tip sphere 17a based on the first tip sphere reference position estimated value as a correction value. In this way, the second tip sphere reference position estimated value is obtained. The second tip sphere reference position estimated value is output to an adder 2121c (which is also referred to as "first adder").

The tip sphere displacement detection unit 19a detects a tip sphere displacement value indicating the displacement of the tip sphere 17a with respect to the tip of the slider 16 (amount of shift from the reference position of the tip sphere 17a) (step S14), and supplies the detected tip sphere displacement value to the adder 2121c.

The adder 2121c calculates a measurement value by adding the tip sphere reference position estimated value and the tip sphere displacement value, and outputs the calculated measurement value (step S15). In this way, the influence due to the frequency transfer characteristic from the scale unit 19b to the tip of the slider 16 is removed by the first filter 2121a. The influence due to the frequency transfer characteristic from the tip of the slider 16 to the tip sphere 17a is removed by the second filter 2121b.

Figure 5:
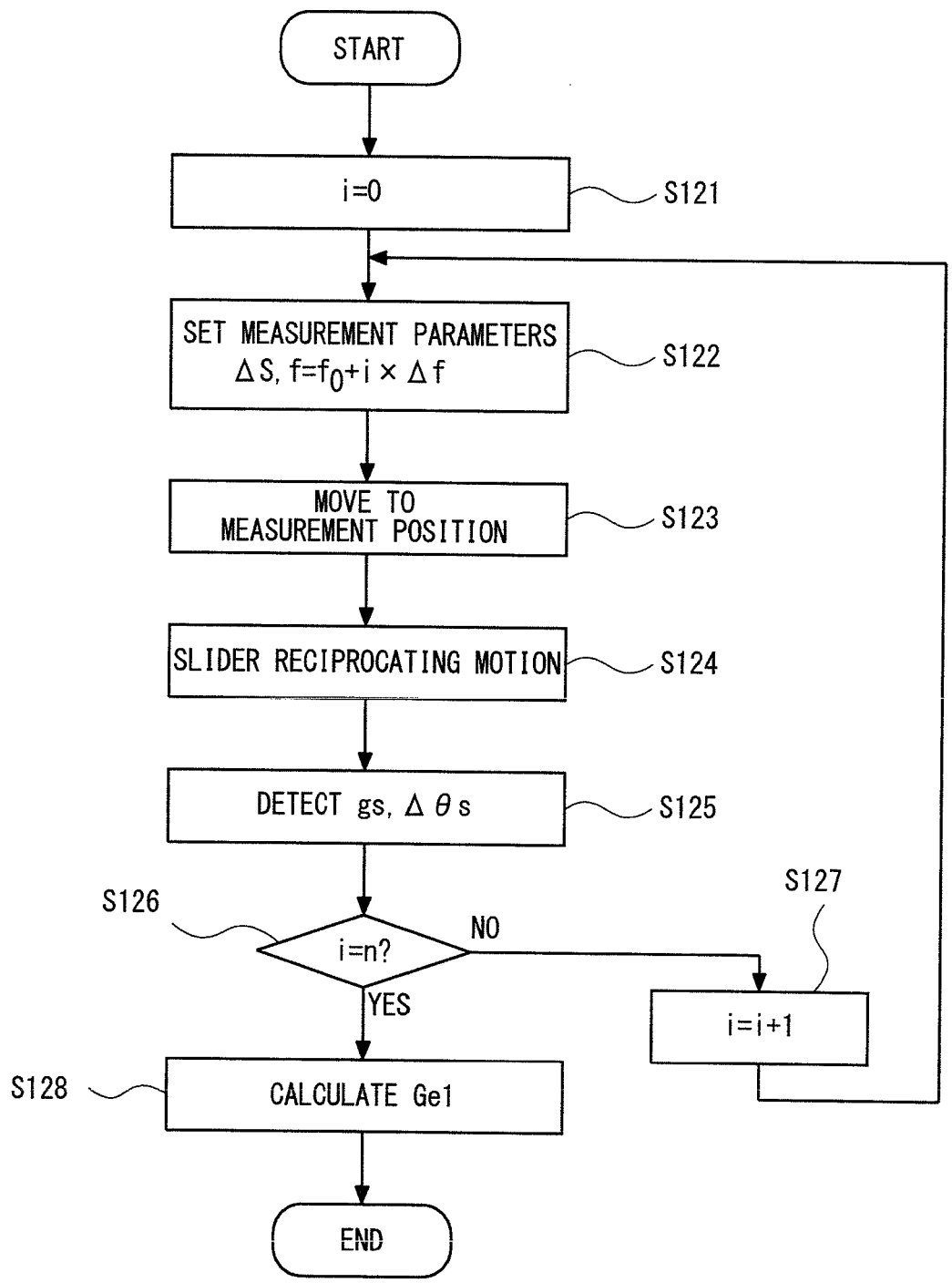

Next, a method of setting a frequency transfer characteristic in the first filter 2121a is explained. FIG. 5 is a flowchart showing a method of setting a frequency transfer characteristic in the first filter 2121a. Firstly, a scanning probe having a sufficiently high response is attached to the slider 16. Next, an object to be measured such as a gage block is placed on the surface plate 11 of the CMM 1. In this process, the object to be measured is disposed so that the surface direction of the object to be measured coincides with the X, Y and Z axis directions of the CMM.

A count value i is set to the initial value (step S121). The count value i is an integer satisfying a relation 0≤i≤n (n is a positive integer).

Then, measurement parameters are set (step S122). In this process, an amplitude ΔS and a frequency f of the reciprocating motion of the slider 16 are set as measurement parameters. In this process, the frequency f is expressed by, for example, Expression (2) shown below.

[Expression 2]

$$f = f_0 + i \times \Delta f \quad (2)$$

Then, the scanning probe 17 is moved to a measurement position in the Y-axis direction (step S123). As a result, the tip sphere 17a of the scanning probe 17 is brought into contact with the object to be measured so that the tip sphere 17a is pushed into the XZ-surface of the object to be measured by a predetermined amount (the tip sphere 17a is shifted in the Y-axis direction by a predetermined amount).

After that, an instruction is provided to the Y-axis driving mechanism 14 so that the slider 16 of the CMM 1 performs reciprocating motion in the Y-axis direction for a predetermined period (step S124). In this process, the slider 16 is preferably made to perform reciprocating motion in such a manner that its displacement in the Y-axis direction changes in a sine-wave pattern.

Since the scanning probe having a sufficiently high response is attached, the Y-axis shift amount output from the tip sphere displacement detection unit 19a can be regarded as the displacement amount of the tip of the slider 16. Therefore, the Y-axis shift amount output from the tip sphere displacement detection unit 19a is compared with the reciprocating motion of the scale unit 19b. The gain gs and the phase Δθs of the Y-axis shift amount with respect to the amplitude ΔS of the scale unit 19b are detected (step S125).

It is determined whether or not the count value i is equal to n (i.e., i=n) (step S126). When the count value i is not equal to n (i.e., i≠n), the count value i is incremented by one and the process returns to the step S122 (step S127). That is, the steps S122 to S126 constitutes a loop process. In this way, it is possible to obtain a frequency transfer characteristic from the scale unit 19b to the tip of the slider 16.

When the count value i is equal to n (i.e., i=n), an approximate function is obtained from actual measurement values of the frequency transfer characteristic (step S128). In this way, it is possible to obtain an estimated value Ge1 of a frequency transfer characteristic from the scale unit 19b to the tip of the slider 16 (i.e., the above-shown Expression (1)).

Next, a method of setting a frequency transfer characteristic in the second filter 2121b is explained. The frequency transfer characteristic in the second filter 2121b changes depending on the type of the scanning probe attached to the slider 16. Therefore, a frequency transfer characteristic for each type of scanning probe is obtained in advance by performing measurement separately for each type of scanning probe.

Firstly, a probe for which a frequency transfer characteristic is to be measured is attached to the slider 16. Then, an estimated value of the frequency transfer characteristic is obtained by a similar method to that for the above-described estimated value Ge1. The obtained estimated value is used as the estimated value of the frequency transfer characteristic from the scale unit 19b to the tip sphere 17a. When this estimated value is represented by Ge0, the estimated value Ge2 of the frequency transfer characteristic from the tip of the slider 16 to the tip sphere 17a can be obtained by Expression (3) shown below.

[Expression 3]

$$Ge2 = Ge0/Ge1 \quad (3)$$

Although the frequency transfer characteristic in the Y-axis direction is explained in the above-described example, frequency transfer characteristics on the X-axis and on the Z-axis can be also obtained by using a similar process to that shown in FIG. 5. Note that the frequency transfer characteristic from the Y-axis scale unit 19by to the tip of the slider 16, the frequency transfer characteristic from the X-axis scale unit 19bx to the tip of the slider 16, and the frequency transfer characteristic from the Z-axis scale unit 19bz to the tip of the slider 16 do not necessary coincide with one another. Therefore, they usually produce different transfer functions. Further, as for the frequency transfer characteristic from the tip of the slider 16 to the tip sphere 17a, the characteristics on the X, Y and Z axes also do not necessary coincide with one another. Therefore, they usually produce different transfer functions.

Further, the transfer function may change depending on, for example, the positions of the beam supports 12a and 12b of the CMM 1 (e.g., whether they are located in the front, the center, or the rear in FIG. 1). In such cases, it is possible to improve the accuracy of the correction filter 2121 even further by obtaining a transfer function for each of the predetermined positions of the slider 16 in the X, Y and Z axis directions in advance and by using a transfer function corresponding to the position in the X, Y and Z axis directions.

Further, in the above-shown example of an acquisition method for the correction filter 2121, when a reciprocation command is provided to the Y-axis driving mechanism 14, only the Y-axis component is output as the output of the tip sphere displacement detection unit 19a. That is, the above-shown example is explained on the assumption that when a reciprocation command is provided to the Y-axis driving mechanism 14, the components on the other axes (X and Z axes) do not change. However, in reality, there are cases where when a reciprocation command is provided only on the Y-axis, the components on the X and Z axes also change. That is, there are cases where when the beam supports 12a and 12b are vibrated in the Y-axis direction (front/rear direction in FIG. 1), the tip sphere 17a of the scanning probe 17 is also vibrated in the X-axis or Z-axis direction. In such cases in which a vibration in a different axis direction occurs, it is possible to estimate the reference position of the tip sphere 17a with higher accuracy by obtaining a transfer function(s) based on that component(s) in advance and by using the correction filter 2121. Note that when a different-axis component(s) is obtained, it is preferable, for example, to bring the tip sphere 17a of the scanning probe 17 into contact with an object to be measured so that the tip sphere 17a is pushed into the object to be measured in the Y-axis direction by a predetermined while restraining the tip sphere 17a in the X-axis direction and in the Z-axis direction. For example, the tip sphere 17a may be fixed to the surface plate 11 by using a rotary joint or the like that prevents the tip sphere 17a from moving in the X, Y and Z axis directions but allows the tip sphere 17a to rotate on the X, Y and Z axes.

By obtaining a transfer function for each axial position and a transfer function(s) based on the different-axis vibration for the slider 16 in this manner and setting these transfer functions in the correction filter 2121, it is possible to estimate the reference position of the tip sphere 17a with higher accuracy.

As described above, in this exemplary embodiment, the correction filter 2121 in which transfer functions obtained from frequency transfer characteristics (relative displacement characteristics) from the scale unit 19b to the tip of the slider 16 and from the tip of the slider 16 to the tip sphere 17a of the scanning probe 17 are set is applied when measurement values are obtained. As a result, it is possible to obtain the position of the tip sphere 17a with higher accuracy. Therefore, it is possible to obtain a measurement value while cancelling out the effect caused by a quadrant projection, a lost motion, a transient phenomenon, a resonance phenomenon, and the like, and thereby to measure an object to be measured such as a ring gage with high accuracy.

Second Exemplary Embodiment

Figure 6:
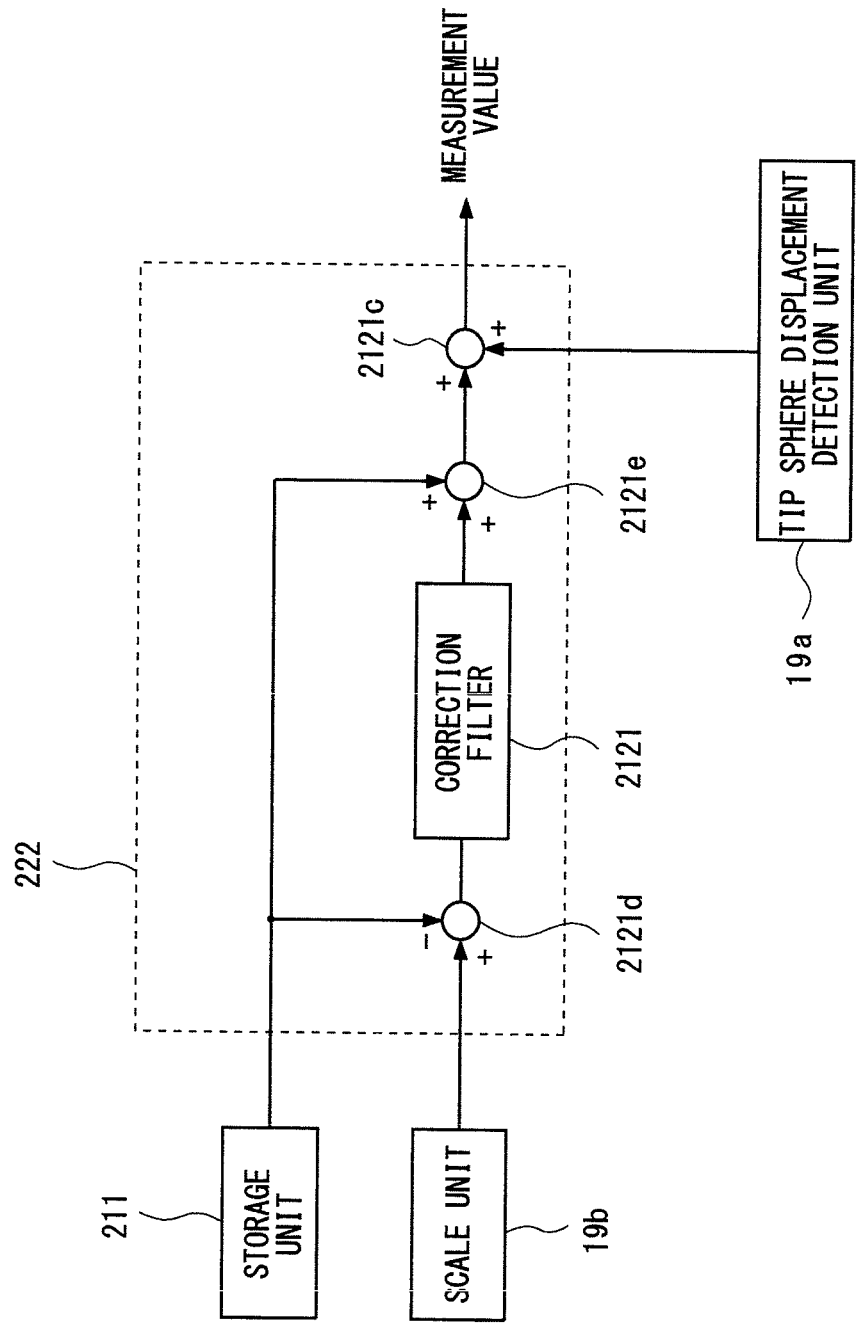
FIG. 6 is a control block diagram of a calculation unit 222 and its peripheral devices of a shape measuring machine 200 according to a second exemplary embodiment.
Figure 7:
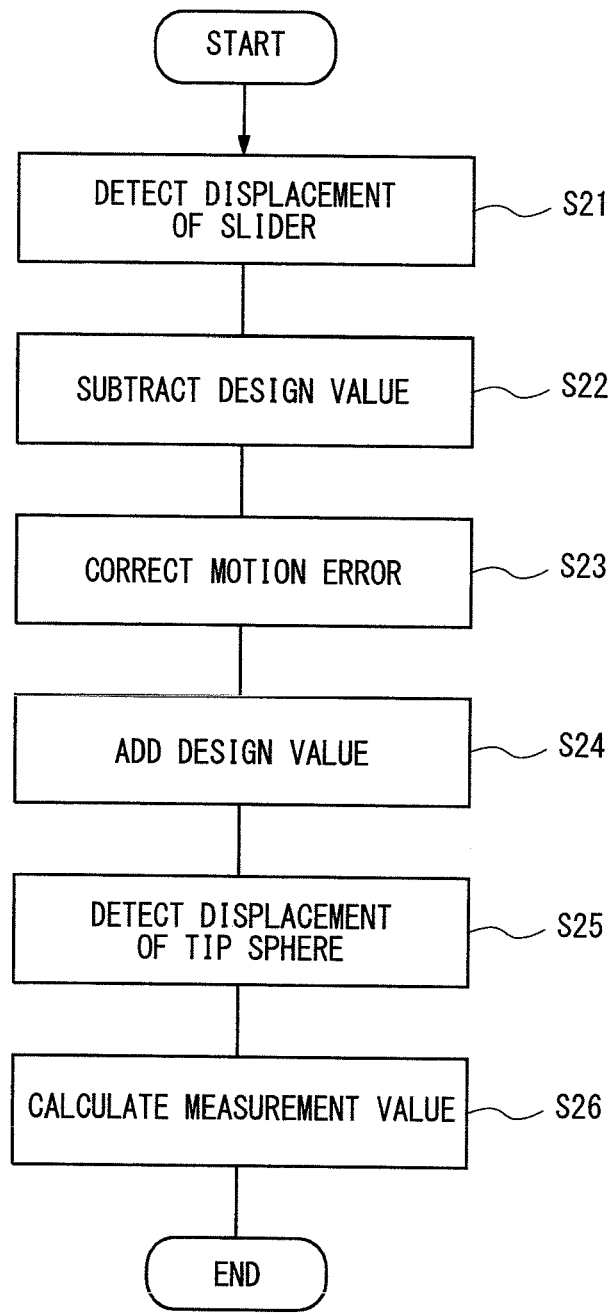
FIG. 7 is a flowchart showing a measurement value calculation process performed by a calculation unit 222.
Figure 8A:
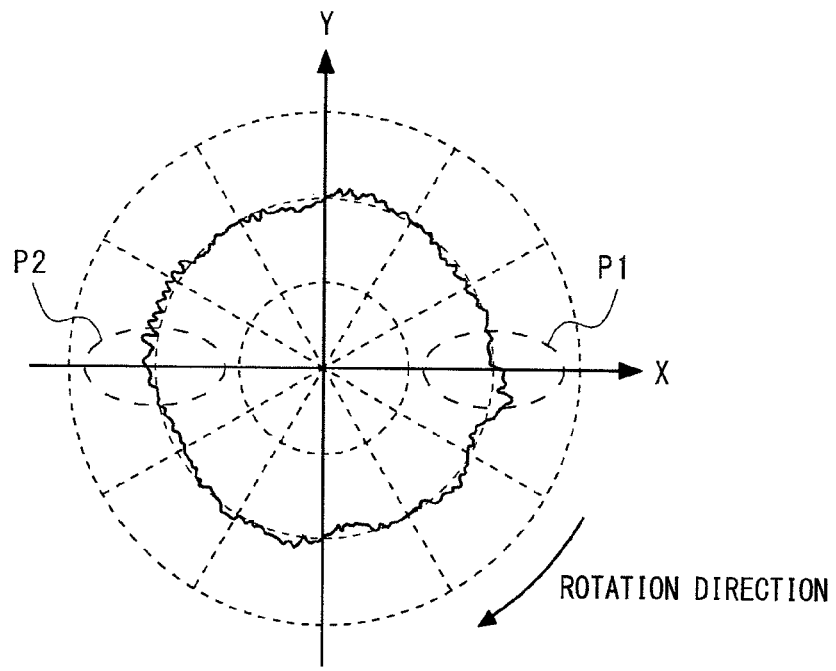
FIG. 8A shows a simulation result of measurement values of an object to be measured 31 in a case where a second exemplary embodiment is applied.

Next, a shape measuring machine 200 according to a second exemplary embodiment is explained. The configuration of the shape measuring machine 200 is substantially the same as that of the shape measuring machine 100 except that the calculation unit 212 is replaced by a calculation unit 222. Since the other configuration of the shape measuring machine 200 is similar to that of the shape measuring machine 100, the calculation unit 222 is explained hereinafter. FIG. 6 is a control block diagram of the calculation unit 222 and its peripheral devices of the shape measuring machine 200 according to the second exemplary embodiment. FIG. 7 is a flowchart showing a measurement value calculation process performed by the calculation unit 222. FIG. 8A shows a simulation result of measurement values of an object to be measured 31 in a case where the second exemplary embodiment is applied.

The configuration of the calculation unit 222 is obtained by adding a subtracter 2121d and an adder 2121e (which is also referred to as "second adder") in the calculation unit 212.

As shown in FIGS. 6 and 7, similarly to the first exemplary embodiment, the scale unit 19b detects a displacement of the slider 16 (step S21) and supplies the detected displacement to the calculation unit 222.

Next, the calculation unit 222 reads a design value(s), i.e., the shape information of the object to be measured 31 that is stored in the storage unit 211 in advance. Then, the subtracter 2121d subtracts the design value from the supplied displacement of the slider 16 and thereby calculates a motion error (step S22).

Next, the calculation unit 222 estimates an error of the reference position of the tip sphere 17a by performing a process for correcting the effect to the reference position of the tip sphere 17a caused by the motion error in the first filter 2121a and the second filter 2121b (step S23).

Next, the adder 2121e adds the design value read from the storage unit 211 to the corrected motion error of the reference position of the tip sphere 17a and thereby calculates a motion-error-corrected estimated value of the reference position of the tip sphere 17a (step S24).

Then, the tip sphere displacement detection unit 19a detects displacement information of the tip sphere 17a (step S25) and calculates a measurement value based on this displacement information of the tip sphere 17a and the motion-error-corrected estimated value of the reference position of the tip sphere 17a (step S26).

Figure 8B:
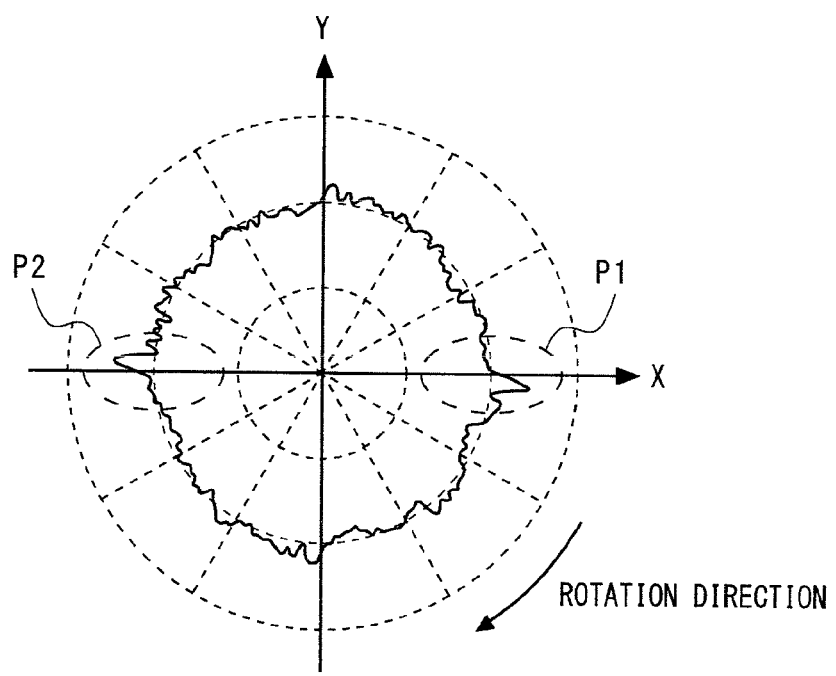
FIG. 8B shows a simulation result of measurement values of an object to be measured 31 in a comparative example where only a first filter is used.

As shown in the simulation result of measurement values according to the second exemplary embodiment shown in FIGS. 8A and 8B, it can be seen that, in comparison to FIG.

13, the projection-shaped measurement error is eliminated in the boundary area P1 between the fourth quadrant and the first quadrant and in the boundary area P2 between the second quadrant and the third quadrant. Note that FIG. 8B shows a simulation result of measurement values of an object to be measured 31 in a comparative example where only the first filter is used. In FIG. 8, although the projection-shaped measurement errors are lowered, they cannot be completely eliminated. Further, the effect of noise components is larger than that in FIG. 8A. Accordingly, it can be understood that measurement can be performed with higher accuracy by introducing the second filter.

As described above, the shape measuring machine 200 uses the first filter 2121a and the second filter 2121b for the motion error.

Note that in typical measurement, for example, when a ring gage having a diameter of 100 mm is measured, the motion error is in the order of several hundred μm in comparison to the design value of 100 mm. Therefore, these values are different by the order of $10^3$. Meanwhile, the single-precision floating-point number calculation accuracy of the calculation unit 212, which is used to implement the first and second filters 2121a and 2121b, is typically in the order of $10^7$ (1.7× $10^7$ 24 bits). Since the motion error is extremely small in comparison to the design value as described above, it is possible to effectively use the calculation dynamic range of the first and second filters 2121a and 2121b by performing the calculation while separating the numerical range by the error. As a result, it is possible to perform a correction process with higher accuracy.

Third Exemplary Embodiment

Figure 9:
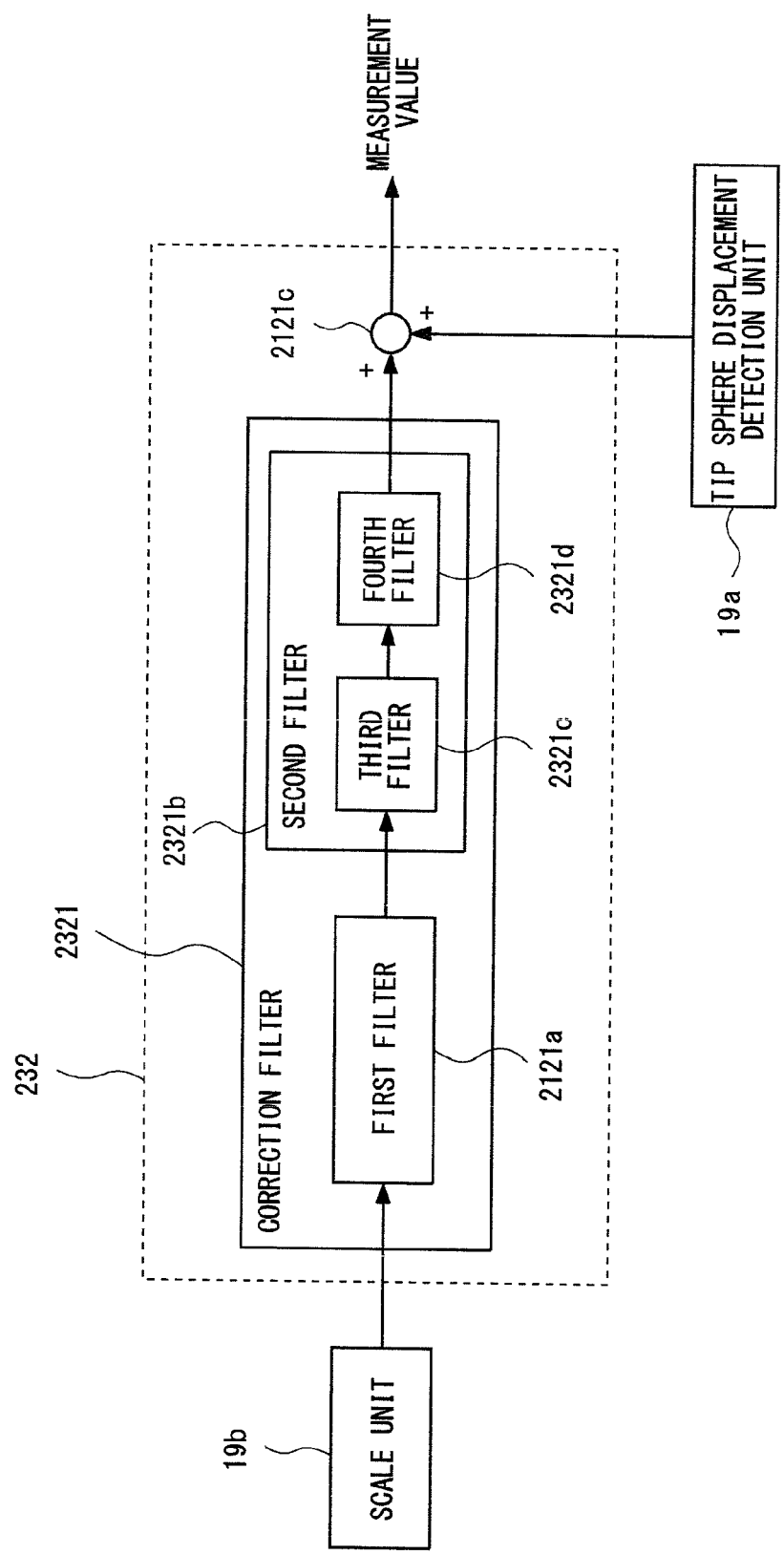
FIG. 9 is a control block diagram of a calculation unit 232 and its peripheral devices of a shape measuring machine 300 according to a third exemplary embodiment.

Next, a shape measuring machine 300 according to a third exemplary embodiment is explained. The configuration of the shape measuring machine 300 is substantially the same as that of the shape measuring machine 100 except that the calculation unit 212 is replaced by a calculation unit 232. Since the other configuration of the shape measuring machine 300 is similar to that of the shape measuring machine 100, the calculation unit 232 is explained hereinafter. FIG. 9 is a control block diagram of the calculation unit 232 and its peripheral devices of the shape measuring machine 300 according to the third exemplary embodiment.

The configuration of the calculation unit 232 is obtained by replacing the correction filter 2121 of the calculation unit 212 by a correction filter 2321. The configuration of the correction filter 2321 is obtained by replacing the second filter 2121b of the correction filter 2121 by a second filter 2321b. The second filter 2321b includes a third filter 2321c and a fourth filter 2321d.

Figure 10:
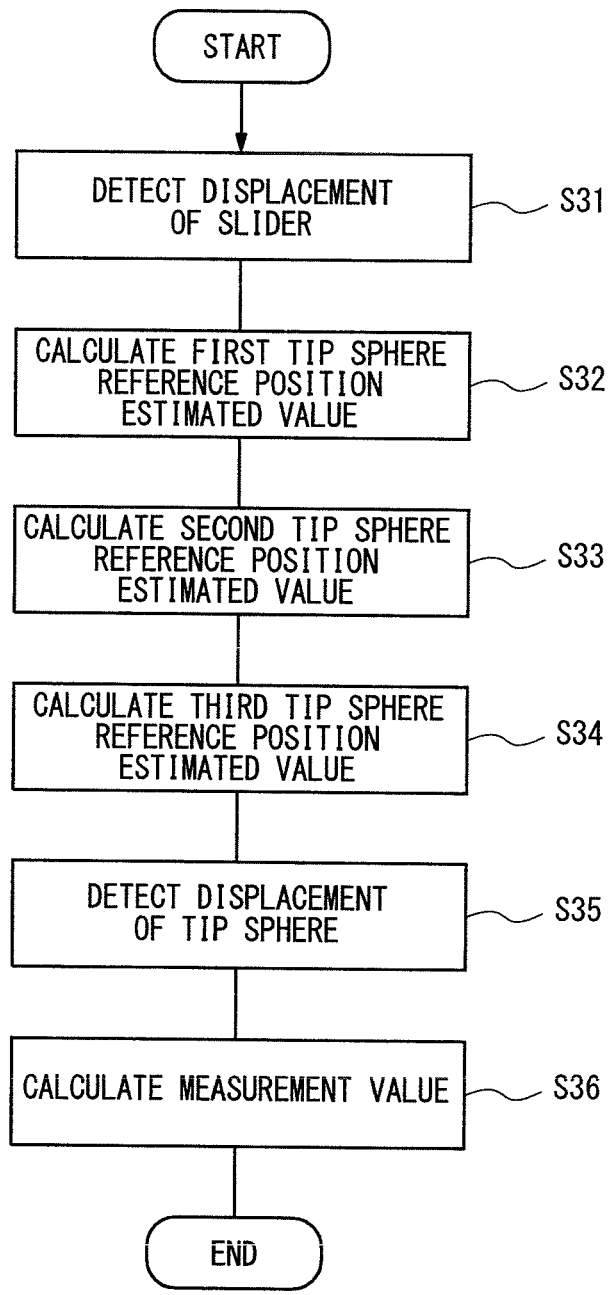
FIG. 10 is a flowchart showing a measurement value calculation process performed by a calculation unit 232.

FIG. 10 is a flowchart showing a measurement value calculation process performed by the calculation unit 232. Steps S31 and S32 are similar to the steps S11 and S12 in FIG. 4, and therefore their explanations are omitted here.

The third filter 2321c calculates a second tip sphere reference position estimated value based on the first tip sphere reference position estimated value calculated by the first filter 2121a (step S33). The third filter 2321c uses an estimated value Ge21(s) that is defined so as to approximate a frequency transfer characteristic from the tip of the slider 16 to the attachment part of the stylus 17b of the scanning probe 17 based on the first tip sphere reference position estimated value as a correction value. In this way, the second tip sphere reference position estimated value is obtained. The second tip sphere reference position estimated value is output to the fourth filter 2321d.

The fourth filter 2321d calculates a third tip sphere reference position estimated value based on the second tip sphere reference position estimated value calculated by the third filter 2321c (step S34). The fourth filter 2321d uses an estimated value Ge22(s) that is defined so as to approximate a frequency transfer characteristic from the attachment part of the stylus 17b of the scanning probe 17 to the tip sphere 17a based on the second tip sphere reference position estimated value as a correction value. In this way, the third tip sphere reference position estimated value is obtained. The third tip sphere reference position estimated value is output to the adder 2121c.

Steps S35 and S36 are similar to the steps S14 and S15 in FIG. 4, and therefore their explanations are omitted here.

In this exemplary embodiment, the correction filter 2321 in which transfer functions obtained from frequency transfer characteristics (relative displacement characteristics) from the scale unit 19b to the tip of the slider 16, from the tip of the slider 16 to the attachment part of the stylus 17b of the scanning probe 17, and from the attachment part of the stylus 17b to the tip sphere 17a are set is applied when measurement values are obtained. As a result, it is possible to obtain the position of the tip sphere 17a with respect to various styluses with higher accuracy in comparison to the first exemplary embodiment. Therefore, it is possible to obtain a measurement value while cancelling out the effect caused by a quadrant projection, a lost motion, a transient phenomenon, a resonance phenomenon, and the like, and thereby to measure an object to be measured such as a ring gage with higher accuracy.

Figure 11A:
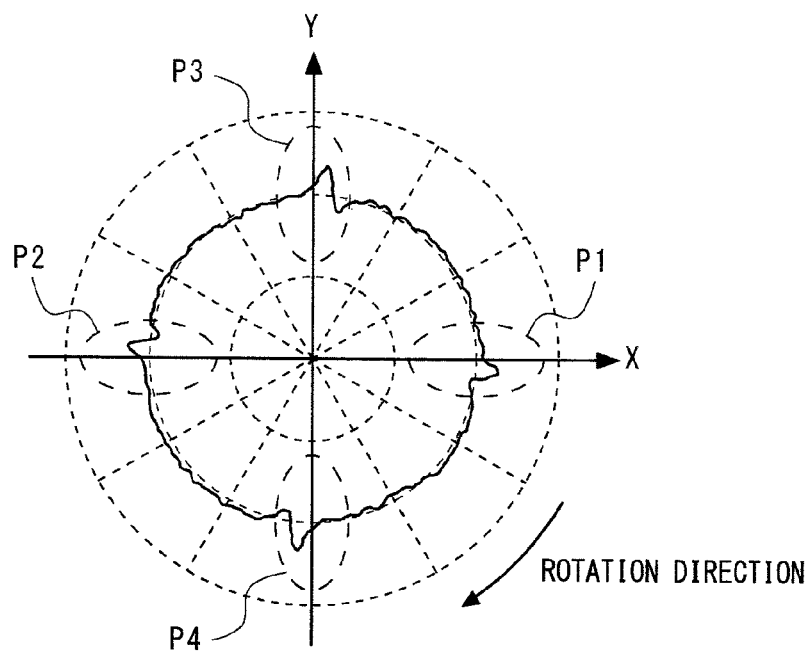
FIG. 11A shows a simulation result of measurement values in a case where measurement is carried out by using a stylus A without using a correction filter 2321 according to a third exemplary embodiment.
Figure 11B:
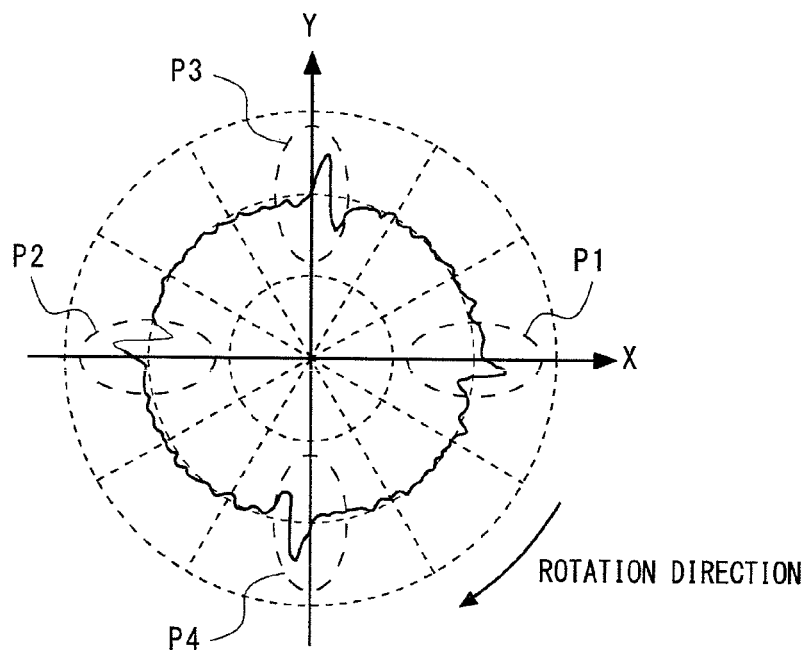
FIG. 11B shows a simulation result of measurement values in a case where measurement is carried out by using a stylus B without using a correction filter 2321 according to a third exemplary embodiment.

FIG. 11A shows a simulation result of measurement values in a case where measurement is carried out by using a stylus A without using the correction filter 2321 according to this exemplary embodiment. FIG. 11B shows a simulation result of measurement values in a case where measurement is carried out by using a stylus B without using the correction filter 2321 according to this exemplary embodiment. As shown in FIGS. 11A and 11B, it can be observed that projection-shaped measurement errors appear near the X-axis (P1 and P2) and the Y-axis (P3 and P4).

Figure 12A:
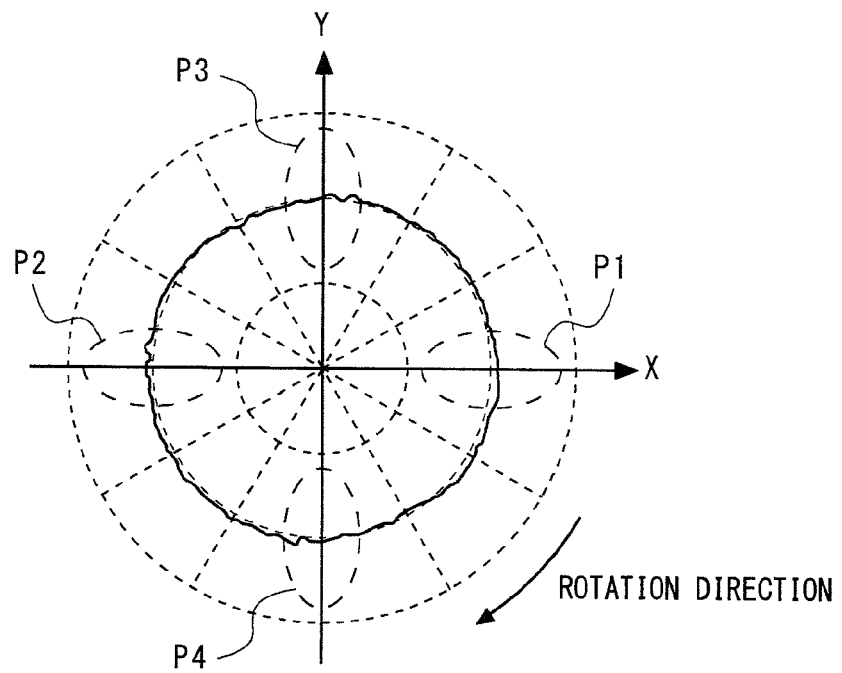
FIG. 12A shows a simulation result of measurement values in a case where measurement is carried out by using a stylus A in a shape measuring machine 300.
Figure 12B:
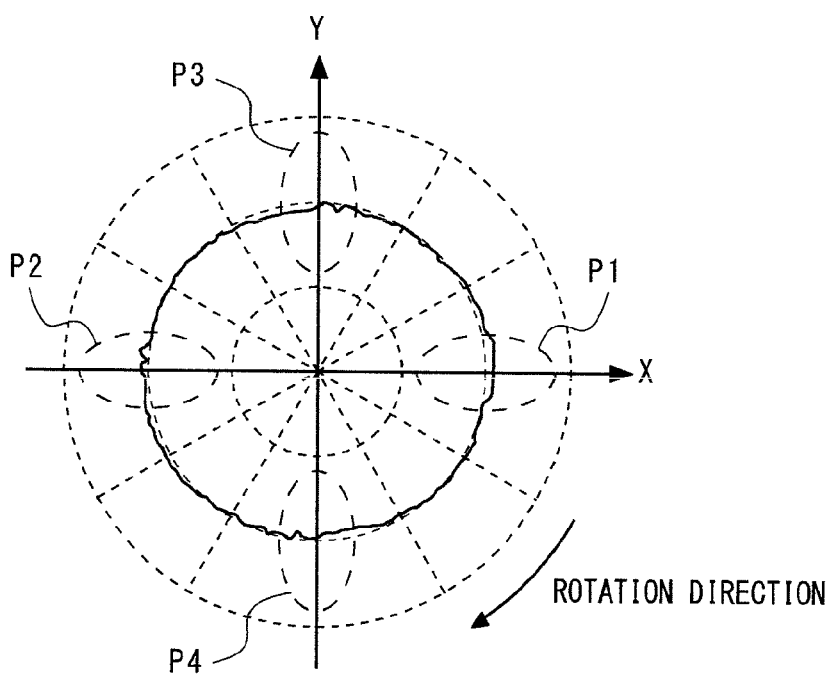
FIG. 12B shows a simulation result of measurement values in a case where measurement is carried out by using a stylus B in a shape measuring machine 300.
Figure 13:
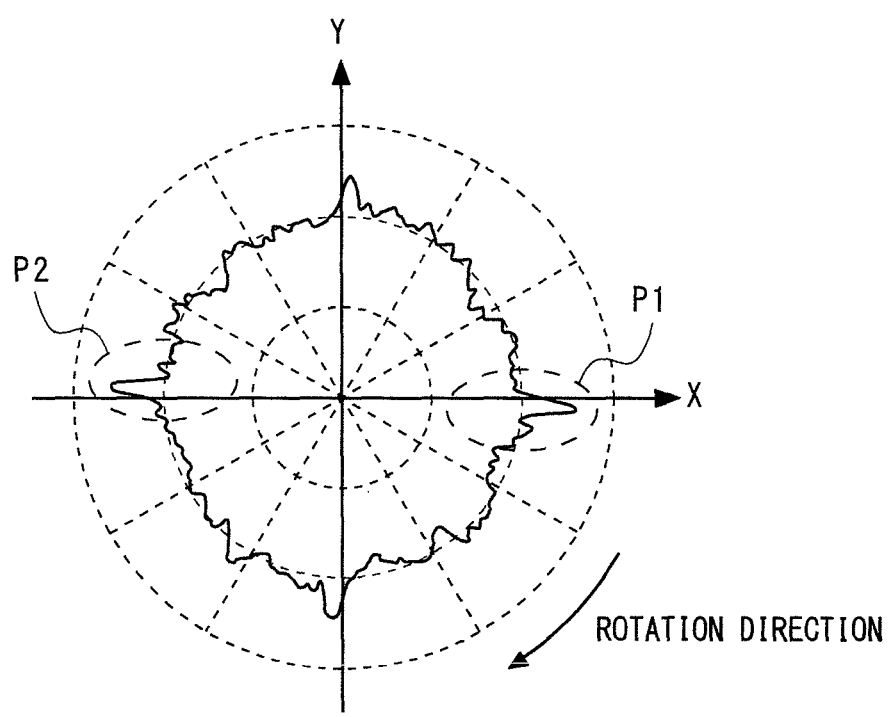
FIG. 13 shows an example of measurement of a ring gage (ring-shaped object to be measured) by using a typical coordinate measuring machine.

FIG. 12A shows a simulation result of measurement values in a case where measurement is carried out by using a stylus A in the shape measuring machine 300. FIG. 12B shows a simulation result of measurement values in a case where measurement is carried out by using a stylus B in the shape measuring machine 300. As shown in FIGS. 12A and 12B, it can be observed that, in the shape measuring machine 300, projection-shaped measurement errors that appear near the X-axis (P1 and P2) and the Y-axis (P3 and P4) in the cases shown in FIGS. 11A and 11B can be eliminated regardless of the type of stylus.

Other Exemplary Embodiments

The present invention is not limited to the aforementioned exemplary embodiments, and these exemplary embodiments can be modified as appropriate without departing from the spirit and scope of the present invention. For example, in the second exemplary embodiment, the design value is read from the storage unit 211 and subtracted from the actually-measured displacement of the slider 16 to obtain the motion error. However, other configurations may be also employed. For example, it is possible to use such a configuration that: an estimated value of the design value of an object to be measured is calculated by a least squares method or the like based on information of an actually-measured displacement of the slider 16; the estimated value is subtracted from the information of the actually-measured displacement of the slider 16 to obtain an estimated motion error; a correction value of the estimated motion error is obtained by using the first filter 2121a and the second filter 2121b for the estimated motion error; and the correction value, the estimated value of the design value, and the displacement of the tip sphere are added to calculate a measurement value. According to this modified example, there is no need to hold the design value in the storage unit 211. Therefore, the present invention can be implemented even for an object to be measured whose design value itself is unknown.

Note that in the second and third exemplary embodiments, it is also possible to improve the accuracy of the first filter 2121a and the second filters 2121b and 2321b even further by obtaining a transfer function for each of the predetermined positions in the X, Y and Z axis directions in advance and by using a transfer function corresponding to the slider position in the X, Y and Z axis directions as in the case of the first exemplary embodiment.

Further, in the choice of a transfer function, the transfer function may be selected for each of the predetermined positions on the individual X, Y, and Z axes. Alternatively, the transfer function may be selected for each of the 3D spatial positions that are determined by predetermined positions on the X, Y, and Z axes.

Although the above-described exemplary embodiments are explained by using example cases where a circle is scanning-measured, the present invention is not limited to this configuration. For example, the present invention can be applied to scanning measurement of a free-form surface and the like.

Further, the present invention can be implemented regardless of whether the scanning measurement is design-value scanning measurement in which the probe follows a predetermined path (design value) or autonomous scanning measurement (in which a measuring machine measures the surface shape of an object to be measured while estimating the surface shape in a step-by-step manner).

Further, although the above-described exemplary embodiments are explained exclusively with the CMM, the present invention is not limited to this configuration. That is, needless to say, the present invention can be also implemented for various measuring machines such as an image measuring machine, a contour measuring machine, a roundness measuring machine, and a surface roughness measuring machine in a similar manner. Further, although the above-described exemplary embodiments are explained exclusively with coordinate/shape measurement, the present invention is not limited to this configuration. That is, needless to say, the present invention can be also implemented for surface property measurement such as roundness measurement, contour measurement, and roughness/undulation measurement in a similar manner. Further, the present invention can be also implemented for a surface property measurement program in a similar manner.

The correction filter 2321 according to the third exemplary embodiment can be also applied in the shape measuring machine 200 according to the second exemplary embodiment.

From the invention thus described, it will be obvious that the embodiments of the invention may be varied in many ways. Such variations are not to be regarded as a departure from the spirit and scope of the invention, and all such modifications as would be obvious to one skilled in the art are intended for inclusion within the scope of the following claims.

What is claimed is:

1. A shape measuring machine comprising:
a scanning probe that performs scanning measurement by using a tip sphere disposed at a tip of a stylus attached to one end of the scanning probe, the tip sphere being configured to come into contact with an object to be measured;
a movably-disposed slider that supports the scanning probe at another end of the scanning probe opposite to the tip sphere;
a scale unit that detects a displacement of the slider;
a tip sphere displacement detection unit that detects a displacement of the tip sphere of the scanning probe with respect to a junction between the scanning probe and the slider; and
a calculation unit that calculates a measurement value from the displacement of the slider detected by the scale unit and the displacement of the tip sphere detected by the tip sphere displacement detection unit, wherein
the calculation unit comprises:
a correction filter that outputs a correction value, the correction value being obtained by correcting the displacement of the slider detected by the scale unit based on a frequency transfer characteristic from the scale unit to the tip sphere; and
a first adder that adds the correction value and the displacement of the tip sphere detected by the tip sphere displacement detection unit, and
the correction filter comprises:
a first filter that corrects the displacement of the slider detected by the scale unit based on a frequency transfer characteristic from the scale unit to the junction between the scanning probe and the slider; and
a second filter that outputs a value as the correction value, the value being obtained by correcting a value corrected by the first filter based on a frequency transfer characteristic from the junction between the scanning probe and the slider to the tip sphere.

2. The shape measuring machine according to claim 1, wherein
the first filter corrects the displacement of the slider detected by the scale unit based on an estimated value of the frequency transfer characteristic from the scale unit to the junction between the scanning probe and the slider, and
the second filter corrects the value corrected by the first filter based on an estimated value of the frequency transfer characteristic from the junction between the scanning probe and the slider to the tip sphere.

3. The shape measuring machine according to claim 2, wherein
the frequency transfer characteristic is actually measured for each movement direction axis of the slider, and
the estimated value of the frequency transfer characteristic is calculated as a transfer function based on an actual measurement value of a frequency transfer characteristic for each movement direction axis of the slider.

4. The shape measuring machine according to claim 1, further comprising a storage unit storing a design value indicating a shape of an object to be measured, wherein
the calculation unit further comprises:
a subtracter that outputs a value obtained by subtracting the design value from the displacement of the slider detected by the scale unit as a motion error of the slider to be input to the first filter; and
a second adder that outputs a value obtained by adding the design value to the value output from the second filter as the correction value output from the correction filter.

5. The shape measuring machine according to claim 1, wherein the second filter comprise:

a third filter that outputs a value obtained by correcting a value corrected by the first filter based on a frequency transfer characteristic from the junction between the scanning probe and the slider to an attachment part of the stylus; and a fourth filter that outputs a value as the correction value, the value being obtained by correcting a value corrected by the third filter based on a frequency transfer characteristic from the attachment part of the stylus to the tip sphere.

6. A method of correcting a shape measurement error comprising:

detecting, by a scale unit, a displacement of a movably-disposed slider, the slider supporting a scanning probe that performs scanning measurement by using a tip sphere disposed at a tip of a stylus attached to one end of the scanning probe, the slider supporting the scanning probe at another end of the scanning probe opposite to the tip sphere, the tip sphere being configured to come into contact with an object to be measured;

detecting a displacement of the tip sphere of the scanning probe with respect to a junction between the scanning probe and the slider;

correcting the displacement of the slider detected by the scale unit based on a frequency transfer characteristic from the scale unit to the junction between the scanning probe and the slider;

outputting a value as the correction value, the value being obtained by correcting the corrected displacement based on a frequency transfer characteristic from the junction between the scanning probe and the slider to the tip sphere; and calculating a measurement value by adding the correction value and the displacement of the tip sphere.

7. The method of correcting a shape measurement error according to claim 6, wherein the displacement of the slider detected by the scale unit is corrected based on an estimated value of the frequency transfer characteristic from the scale unit to the junction between the scanning probe and the slider, and the corrected displacement of the slider is corrected based on an estimated value of the frequency transfer characteristic from the junction between the scanning probe and the slider to the tip sphere.

8. The method of correcting a shape measurement error according to claim 7, wherein the frequency transfer characteristic is actually measured for each movement direction axis of the slider, and the estimated value of the frequency transfer characteristic is calculated as a transfer function based on an actual measurement value of a frequency transfer characteristic for each movement direction axis of the slider.

9. The method of correcting a shape measurement error according to claim 6, wherein a value obtained by subtracting a design value from the displacement of the slider detected by the scale unit is corrected based on the frequency transfer characteristic from the scale unit to the junction between the scanning probe and the slider, and a value obtained by adding a value obtained by correcting the corrected value based on the frequency transfer characteristic from the junction between the scanning probe and the slider to the tip sphere and the design value is output as the correction value.

10. The method of correcting a shape measurement error according to claim 6, wherein a first value obtained by correcting the corrected displacement based on a frequency transfer characteristic from the junction between the scanning probe and the slider to an attachment part of the stylus is output, and a value obtained by correcting the first value based on a frequency transfer characteristic from the attachment part of the stylus to the tip sphere is output as the correction value.

* * * * *